United States Patent Office 3,362,837
Patented Jan. 9, 1968

3,362,837
DENSE HEAT INSULATING AND
NONABSORBENT CONCRETE
James Keith Walker, Lincoln, Nebr., assignor to National Pumicite Development Corporation, Lincoln, Nebr., a corporation of Nebraska
No Drawing. Filed Dec. 28, 1965, Ser. No. 517,106
9 Claims. (Cl. 106—98)

This application is a continuation-in-part of my copending application, Ser. No. 330,637 for Concrete Additive, filed Dec. 16, 1963, and now abandoned.

This invention relates to concrete and more particularly to a hydraulic concrete additive for changing the characteristics of a concrete mix and the finished products formed therefrom.

A conventional hydraulic, dense concrete is formed of a cement (normally Portland cement), sand, gravel or crushed rock aggregate and water. This is the most commonly used of all hydraulic, construction-type concretes, since with proper control it has high strength and is relatively inexpensive. In order to change some of the characteristics of a hydraulic concrete, many different types of additives have been proposed. Some of these additives do change the specific characteristics of the concrete, but in many cases the cost of the additive is not warranted by the small changes which result in only a few of the essential characteristics of the concrete. Thus, while many additives are known for concrete, very few are used commercially due to many factors and particularly the failure of the additives to provide economic changes in a majority of the characteristics of the concrete.

In addition to certain chemical additives, various lightweight materials, both natural and processed, have been suggested as substitutes for a substantial portion or all of the aggregate for forming lightweight concretes having characteristics different from the normal dense concrete. The forming of these lightweight concretes involves substituting a lightweight material for a substantial portion of the commonly used sand, gravel or crushed rock aggregate. The low density concrete formed by using the lightweight aggregates lacks some of the desirable characteristics of the commonly used dense concrete, that is, compressive strength, cheapness, tensile strength, a high modulus of elasticity, etc.

According to the present invention I have provided an additive for conventional sand and gravel aggregate concrete which economically improves a substantial number of the characteristics of conventional dense concrete. By using the additive according to the invention, the compressive strength is increased, the density of the concrete is increased, shrinkage of the finished product is substantially reduced, thereby reducing cracking in curing, etc. Concrete formed with the additive has an unexpected high insulation quality, for both heat and sound. Concrete produced according to the invention has a remarkable increased waterproofness which is not available in ordinary concretes with other additives. In addition, the concrete has better workability, and has a high early compressive and tensile strength.

The invention provides for the addition of from 5-35 volume percent of expanded pumicite per cubic yard of conventional sand and gravel aggregate concrete mix. A conventional batch of concrete, using conventional amounts of cement (4-7 sacks per cubic yard of mix) mixed with the conventional sand and gravel or crushed rock aggregate and water is thoroughly mixed, and immediately prior to pouring the additive of the invention is thoroughly mixed with the concrete mixture. After thorough mixing, the concrete is then poured and finished. The additive is useful with conventional aggregate, e.g. sand, gravel, crushed rock, cinders, crushed slag, etc., as well as with various conventional cements and pozzuolana, including Portland cement, aluminite cement, magnesium oxychloride cements, gypsum plaster, etc.

The additive of the invention is an expanded or bloated pumicite. Pumicite is a volcanic siliceous glass in very fine pulverulent condition. Pumicite has been variously called geyserite, volcanic dust, volcanic ash, Gibson Grit, Diamond Grit, native pumice, etc. The material is found in beds in some of the Midwestern States of the United States, for example, Kansas, Nebraska, Oklahoma, etc. As mined, the raw material is generally flat, irregular shards and these bloat (expand) and break up into a plurality of small, sealed hollow spheres on heating.

Pumicite is generally finer than 100 mesh as mined, and when graded weighs on the order of 50–60 pounds per cubic foot. The pumicite is characterized by its ability to swell and expand on sudden heating which effectively breaks up, softens or plasticizes the particles and the bound water bloats or expands the material so that it forms a plurality of small hollow spheres. The volume of the expanded material is 10–12 times the raw material, but is of a smaller size, in the range of 200–300 mesh. During the expanding operation there is a substantial loss in density and the forming of a glassy type surface on the tiny hollow spheres. The expanded or bloated pumicite has a density of from 5–6 pounds per cubic foot. The pumicite is expanded at a temperature of about 1000° C. by passing it through a high temperature flame to provide a sudden heating. The heated material is then subjected to a fast cooling by permitting it to fall through a cooler gaseous atmosphere so that the particles do not agglomerate while hot and plastic. Generally, the pumicite is dropped through a vertically directed flame and gathered in a collection system above the flame. The expanded material does not require grinding since it is in the size range of 200–300 mesh and the spherical configuration of the particles is retained.

The concrete which may be used in the conventional type of hydraulic concrete in which 3 to 10 and preferably about 3 to 8 sacks of cement (commonly Portland cement) are used per cubic yard of the concrete mix. Sufficient sand for binder is utilized along with larger aggregate which may be gravel, crushed stone or the like. Such concrete is generally identified by the amount of contained cement, thus, 5 sack concrete, 6 sack concrete, etc. The mixing of the concrete is performed in the normal manner and may be utilized with mixed-on-the-job concrete or ready-mix concrete or the like. The amount of expanded pumicite which is effective is in the range of from 5 to 35 volume percent of expanded pumicite based on the dry ingredients, and the preferred range is 10–25 volume percent. In one preferred form of the invention, about 20 volume percent of the expanded pumicite is added to each cubic yard of conventional dense cement mix while it is still wet and during the mixing stage. This is about 6 cubic feet of expanded pumicite per cubic yard of the dry ingredients. The addition of the expanded pumicite does not materially change the volume of the one cubic yard and surprisingly increases the density of the concrete. The weight of the 20 volume percent of expanded pumicite added is in the range of from 35–40 lbs. per cubic yard of the dry mix, which on the average weighs 2700–3000 lbs. In the usable range of 5–35 volume percent, the weight of expanded pumicite added is about 10–65 lbs. per cubic yard of dry ingredients of concrete mix. This amounts to about 0.33 to 2.4 percent by weight and in the preferred range is 0.5 to 1.8 percent by weight.

The concrete ingredients, immediately prior to being poured, are thoroughly mixed, and then the desired amounts of expanded pumicite added and thoroughly mixed with the concrete. The following two tables show the results of compression tests and weights of various mixes of concrete using varying amounts of expanded pumicite. The concrete was 6 sack Portland cement mix with conventional sand and gravel aggregate. The amount of expanded pumicite is based on the dry volume of the cement and aggregate.

TABLE I.—7 DAY COMPRESSIVE STRENGTH

| Test Cylinder | Composition, volume percent | Total Load in lbs. | P.s.i. | Density, lbs. per cu ft. | Remarks |
|---|---|---|---|---|---|
| 1 | 100% S & G | 59,375 | 2,100 | 141.9 | |
| 2 | 10% P, 90% S & G | 86,375 | 3,051 | 142.2 | |
| 3 | 20% P, 80% S & G | 69,375 | 2,454 | 139.2 | |
| 4 | 30% P, 70% S & G | 35,000 | 1,238 | 113.0 | |
| 5 | 40% P, 60% S & G | 30,625 | 1,083 | 127.4 | |
| 6 | 50% P, 50% S & G | 25,000 | 884 | 116.5 | |
| 7 | 60% P, 40% S & G | 23,125 | 818 | 113.9 | |
| 8 | 70% P, 30% S & G | 16,750 | 593 | 98.2 | Cylinder cracked in mold. |
| 9 | 80% P, 20% S & G | 11,875 | 420 | 87.2 | |
| 10 | 90% P, 10% S & G | 8,750 | 310 | 69.4 | Cylinder cracked in mold. |
| 11 | 100% P | 5,625 | 199 | 53.1 | Cylinder cracked in mold. |

P = Expanded pumicite in size range of 200–300 mesh.
S & G = Conventional sand and gravel aggregate.

TABLE II.—30 DAY COMPRESSIVE STRENGTH

| Test Cylinder | Composition, volume percent | Total Load in lbs. | P.s.i. | Density, lbs. per cu ft. | Remarks |
|---|---|---|---|---|---|
| 12 | 100% S & G | 112,500 | 3,979 | 142.8 | |
| 13 | 10% P, 90% S & G | 123,125 | 4,355 | 143.1 | |
| 14 | 20% P, 80% S & G | 108,125 | 3,825 | 139.6 | |
| 15 | 30% P, 70% S & G | 70,625 | 2,498 | 132.9 | |
| 16 | 40% P, 60% S & G | 60,000 | 2,122 | 127.9 | |
| 17 | 50% P, 50% S & G | 42,500 | 1,503 | 117.6 | |
| 18 | 60% P, 40% S & G | 47,000 | 1,662 | 114.5 | |
| 19 | 70% P, 30% S & G | 30,000 | 1,061 | 99.5 | |
| 20 | 80% P, 20% S & G | 21,250 | 752 | 89.4 | Cylinder cracked in mold. |
| 21 | 90% P, 10% S & G | 15,000 | 531 | 64.7 | Cylinder cracked in mold. |
| 22 | 100% P | 10,000 | 354 | 54.0 | Cylinder cracked in mold. |

P = Expanded pumicite in size range of 200–300 mesh.
S & G = Conventional sand and gravel aggregate.

Two test panels were molded from 6 sack concrete. The size of the panels was 3 in. x 6 in. x 16 in. One panel was made from a mix containing about 22% by volume of pumicite and the other was made from conventional dense concrete. The compressive strength at 124 days was 3,021 lbs. per square inch for the block with the pumicite and only 1,953 lbs. per square inch for the block without pumicite additive. The 6 cu. ft. of pumicite weighed about 40 pounds compared to about 3429 lbs. of aggregate and cement or about 1.16% by weight. There was no appreciable difference in weight of the two panels as both weighed 32.0 lbs.

As noted in the tables at about 10 volume percent of pumicite, the strength of the concrete is substantially greater and the density of the concrete is also greater. This shows that the expanded pumicite is not replacing the dense aggregate but is actually filling the spaces between the dense aggregate particles. In the preferred range of about 10 to 35% (about 3–10 cu. ft. of expanded pumicite per cubic yard of concrete) an increase of strength is noted. With larger aggregate the upper range of added pumicite also increases the density. It is obvious that the characteristics of the aggregate mix determines the amount of pumicite that may be used to increase density and strength. The greater the space between the dense aggregate particles the more pumicite is needed to fill the spaces. Conversely, the finer the dense aggregate the less the space and a lesser quantity of expanded pumicite is necessary. As shown below, the small amount of expanded pumicite substantially increases the insulation qualities and waterproof qualities of the concrete. Above about 35 volume percent the pumicite actually replaces some the dense aggregate forming a light weight concrete with a drastic reduction in strength and in density.

A series of tests were made to determine water tightness and insulation qualities of concrete with expanded pumicite. For the following tests, six sacks (Portland cement) concrete was used with sand and in specified instances with cinders, or gravel or crushed rock or large aggregate.

In one test a number of concrete blocks, of conventional size of 8" x 8" x 16" with two central holes therein, were made of cinder aggregate, sand and cement in the conventional manner. To one batch of the concrete mix, after mixing in the normal manner, was added about 6 cubic feet of expanded pumicite added per yard of the conventional cinder aggregate mix. After forming the blocks and curing for 28 days, a waterproof cover was sealed across one end and water was placed in the two hollow centers of samples of both types of the blocks. At the end of 24 hours the blocks which were made without the pumicite showed water seeping through the walls of the blocks, while the blocks with the pumicite showed no water or dampness whatever. At the end of a week with the water standing in the holes the blocks without the pumicite were bleeding water freely while the blocks with the pumicite still maintained a dry exterior.

A number of tests, outlined below, were conducted to demonstrate the insulation qualities of concrete with the small amount of pumicite, according to the invention, mixed with the concrete prior to molding. The tests, also, show the water proofness of the cured concrete containing the expanding pumicite as compared with conventional concrete without the expanded pumicite. For these tests one set of samples was made using conventional concrete containing 564 lbs. of cement, 2,965 lbs. of sand and gravel (to meet the State of Nebraska specifications for 47–B concrete) and about 31.2 gallons of water. The samples in which their identifying number is not followed by a letter indicates concrete without expanded pumicite. A portion of the samples were made with a similar mix but with about 6 cubic feet of expanded pumicite per cubic yard of the mix mixed with the concrete prior to the molding of the slabs. This amounts to about 22 volume percent of expanded pumicite but only slightly over 1 percent by weight. The samples with the expanded pumicite are identified by a number followed by the letter "P."

*Test 1*

A sample block without expanded pumicite was made in accordance with the above and identified as II, and a sample block was made containing expanded pumicite and identified as IP. For the test, one face of each slab was subjected to various temperatures and for various periods of time. Observations were made on the opposide face of the slab which was exposed to room temperature. During the test care was taken so that only the one face of the specimen was exposed to the cold temperature. During the test the relative humidity at room temperature was measured. The effect of heat transier is indicated by the appearance of the room temperature side of the block. The results of the test are shown below in Table III.

TABLE III

| Exposure Time, hr. | Cold Temp., °F. | Room Temp., °F. | Room R.H., percent | Sample Condition |
|---|---|---|---|---|
| SAMPLE IP | | | | |
| 4 | 32 | 80 | 55 | Dry |
| 8 | 0 | 82 | 55 | Dry |
| 24 | −11 | 78 | 56 | Dry |
| 24 | −17 | 77 | 63 | Dry |
| 24 | −22 | 74 | 59 | Wet |
| SAMPLE II | | | | |
| 24 | 30 | 77 | 62 | Dry |
| 24 | 0 | 78 | 59 | (1) |
| 24 | −11 | 74 | 63 | (2) |

[1] Light film of moisture.
[2] Covered with ice ¼" thick.

The cold temperature was held to an accuracy of +1° C.

Test 2

Two samples of brick 12″ x 6″ x 3″ were made each with a simulated brick facing on both sides. The sample identified as 3 was made in accordance with the formulation given above without the expanded pumicite and sample 4P was made with a similar formulation but with about 6 cubic feet of expanded pumicite added to the concrete prior to molding. The test involved exposing the specimens to direct sunlight with a minimum effect of moving air across the brick face. The bricks were moved to follow the sun. The temperature of the side of the brick exposed to the sun was then checked at various times with a pyrometer as was the side in the shade. The results of the test are shown in the following table.

TABLE IV

| Time | Sunshine, °F. | | Shade, °F. | | Air Temperature Shade, °F. |
|---|---|---|---|---|---|
| | 3 | 4P | 3 | 4P | |
| 9:30 a.m. | 118 | 117 | 90 | 90 | 85 |
| 10:00 a.m. | 127 | 126 | 85 | 85 | 86 |
| 10:30 a.m. | 130 | 131 | 90 | 88 | 90 |
| 11:00 a.m. | 131 | 131 | 97 | 90 | 92 |
| 11:30 a.m. | 129 | 130 | 97 | 92 | 93 |
| 12:00 p.m. | 129 | 130 | 97 | 92 | 94 |
| 12:30 p.m. | 136 | 139 | 107 | 104 | 96 |
| 2:30 p.m. | 129 | 130 | 109 | 105 | 96 |
| 4:30 p.m. | 122 | 124 | 100 | 98 | 94 |
| 5:00 p.m. | 124 | 122 | 103 | 97 | 94 |

A sample 18″ x 16″ x 6″ slab was made of six-sack cement with the conventional sand and gravel aggregate. A similar size slab was made but expanded pumicite was added on a ratio of about 6 cubic feet of expanded pumicite to each yard of the concrete mix. After setting and curing the K (heat transfer coefficient) factor was determined for each slab. The slab without the pumicite was found to have a K factor of 8.5 B.t.u. per hour, square foot, degree F., per one inch thickness. The sample with the expanded pumicite had a K factor of 4.2 of the same dimensions. A 4 inch concrete block was made from the conventional cinder aggregate, sand and cement (6 sack basis) and a test of the block showed it had a K factor of 8.6. A similar 4 inch block of the cinder aggregate, which contained on the ratio of 6 cubic feet of expanded pumicite to each yard of concrete mix, was tested and it was determined to have a K factor of 3.75 after setting and curing.

Floors laid on the ground and basement walls and the like are readily poured with the cement having additive of the present invention. Such concrete, according to the invention, is essentially waterproof and, since it is waterproof, it is highly resistant to freezing and thawing after initial curing. The floors and below-grade walls may be poured without vapor barriers thereby reducing the expense. The finished concrete is of a finer texture since the workability of the concrete is greatly improved by the addition of the expanded pumicite. The concrete with expanded pumicite flows freely and uniformly fills the voids in forms for walls and floors very readily.

The concrete with expanded pumicite is a structural grade concrete and meets building code requirements for single and multiple story walls, foundations etc. The material with its good insulation qualities may be used as is for building walls including both outside and inside surfaces. Actual experience has shown that the inside surface may be used without a vapor barrier, furring out, paneling, dry walling and the like, thereby reducing the average cost of a completed building from 20 to 35 percent. The workability of concrete is greatly improved by the addition of expanded pumicite, and a finer textured finish results on removal of the forms. The improved workability decreases the amount of troweling necessary to finish floors and flat work, and it, also, produces a finer textured surface. A number of hog houses were built using a concrete with the additive of the invention. These houses had concrete floors and walls. It was discovered that the floors were waterproof and their insulating qualities were sufficient to permit the hogs to farrow on the bare floor. Also, the houses could be washed out daily since the concrete did not absorb water as does conventional concrete.

The modern trend to labor saving devices and methods has increased the use of pumping concrete from a supply to the point of use. Conventional 5 or 6 sack concrete is not pumpable. To make it flow readily enough to pump, the concrete must be made up as 7–10 sack concrete and usually more sand is used in place of the coarse aggregate. By adding from 3–10 cubic feet of expanded pumicite to conventional 5 or 6 sack concrete, the concrete mix is easily and readily pumped through conventional concrete pumps.

The additive in the concrete changes many of the characteristics of conventional hydraulic concrete, e.g. increases such characteristics as compressive strength, insulation qualities, waterproofness, acoustical insulation, resistance to freezing, etc.; it reduces shrinkage during curing and dramatically reduces the dew point or condensation.

While the invention has been illustrated by reference to particular embodiments, there is no intent to limit the spirit or scope of the invention to the precise details so set forth, except as defined in the following claims.

I claim:
1. The method of making dense heat insulating and nonabsorbent concrete which comprises providing a conventional dense concrete mix comprising cement, coarse aggregate, sand and water mixing therewith expanded pumicite in an amount and of a particle size sufficient to fill a majority of the voids between the dense aggregate particles, shaping and allowing the mix to harden, said pumicite particles being substantially all discrete hollow glassy surfaced spheres of a size of the order of 200 mesh and smaller.

2. The method of claim 1 wherein the amount of the expanded pumicite is sufficient to fill substantially all the voids in the mix.

3. The method of claim 1 wherein the density of the pumicite is of the order of 5 to 6 pounds per cubic foot and the amount thereof does not exceed 2.4% by weight of the dry ingredients.

4. The method of claim 3 wherein the amount of pumicite lies in the range of .5% to 1.8% by weight of the dry mix.

5. A dense heat insulating and nonabsorbent concrete comprising the hardened product obtained when a conventional dense concrete mix comprising water, cement, coarse aggregate and sand is mixed with expanded pumicite in an amount and of a particle size sufficient to fill a majority of the voids between the dense aggregate particles and allowed to set, said expanded pumicite being substantially all hollow discrete glassy surfaced spherical particles of a size of the order of 200 mesh and smaller.

6. A dense heat insulating and nonabsorbent concrete as set forth in claim 5 wherein said pumicite fills substantially all the voids.

7. A dense heat insulating and nonabsorbent concrete as set forth in claim 5 wherein the cement is present in the ratio of 3 to 10 sacks per cubic yard of mixed coarse aggregate and cement and sand and wherein said expanded pumicite comprises from 5 to 35 volume percent of the mix.

8. A dense heat insulating and nonabsorbent concrete as set forth in claim 7 wherein the density of said pumicite is of the order of 5 to 6 pounds per cubic foot and wherein the amount of said pumicite does not exceed 2.4% by weight of the dry mix.

9. A dense insulating and nonabsorbent concrete as set forth in claim 8 wherein said pumicite fills substantially all of the voids.

References Cited

UNITED STATES PATENTS

| | | | |
|---|---|---|---|
| 2,315,732 | 4/1943 | Patch | 106—97 |
| 2,501,698 | 3/1950 | Stecker. | |
| 2,501,699 | 3/1950 | Stecker. | |
| 2,565,107 | 8/1951 | Watts. | |
| 2,634,207 | 4/1953 | Miscall. | |
| 2,858,227 | 10/1958 | Rodsky | 106—97 |
| 2,880,101 | 3/1959 | Ulfstedt | 106—98 |

FOREIGN PATENTS

| | | |
|---|---|---|
| 395,426 | 7/1933 | Great Britain. |

OTHER REFERENCES

Lea and Desch, The Chemistry of Cement and Concrete, Edward Arnold Ltd., London, 1956, 2nd Ed., pages 449–501.

TOBIAS E. LEVOW, *Primary Examiner.*

HELEN H. McCARTHY, *Examiner.*

S. E. MOTT, *Assistant Examiner.*